United States Patent Office 3,508,828
Patented Apr. 28, 1970

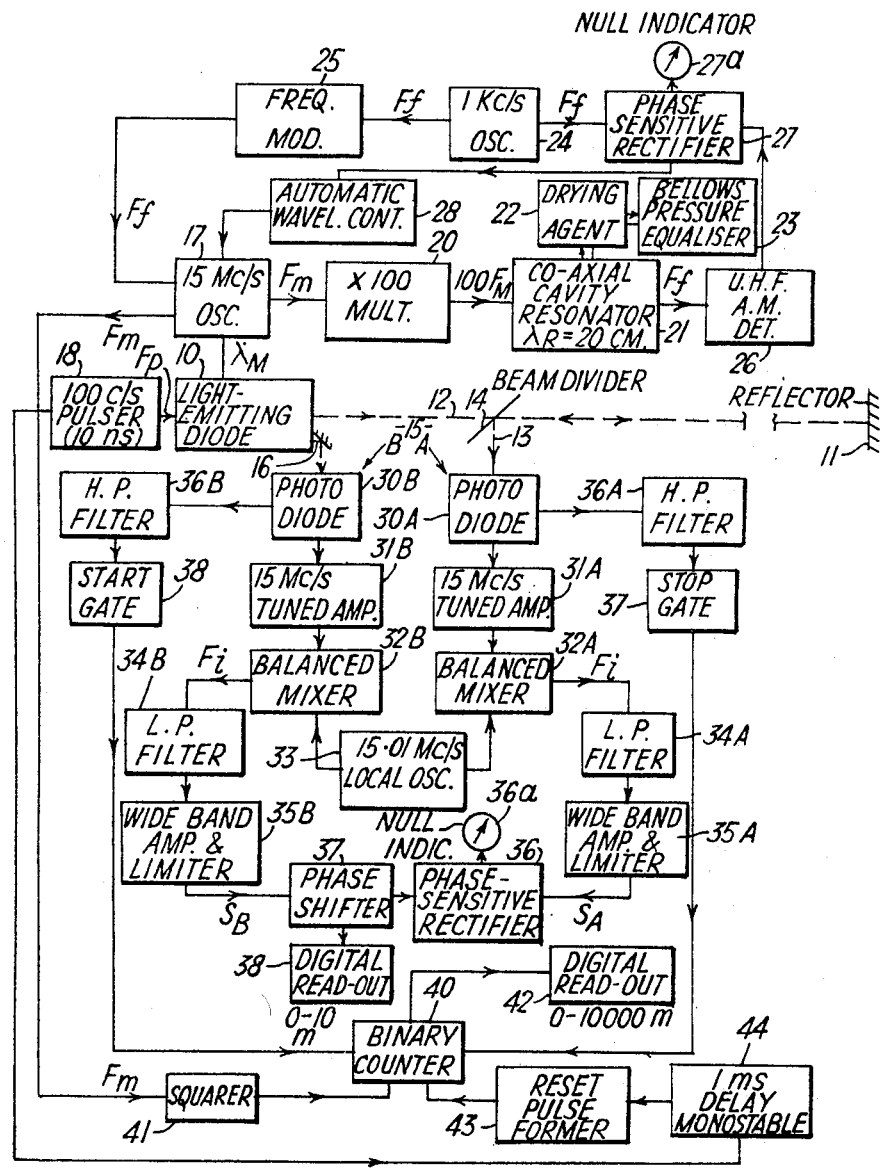

3,508,828
DISTANCE MEASURING APPARATUS
Keith Davy Froome and Robert Howard Bradsell, Teddington, England, assignors to National Research Development Corporation, London, England, a British corporation
Filed Nov. 14, 1966, Ser. No. 594,199
Claims priority, application Great Britain, Nov. 19, 1965, 49,232
Int. Cl. G01c 3/08
U.S. Cl. 356—5                          10 Claims

ABSTRACT OF THE DISCLOSURE

A distance measuring apparatus utilizing the transmission of a beam over the distance to be measured includes a cavity resonator for controlling the wavelength of a modulation oscillator used in producing an amplitude pulse marked modulation signal having a stabilized predetermined wavelength. A counter counts the number of cycles of the modulation signal between transmission and reception of a pulse and a phase detector detects the phase difference between the modulation of the transmitted and received beams so that the distance to be measured is indicated in terms of a whole number of modulation wavelengths as determined by the counter and a fraction of a modulation wavelength as determined by the phase detector.

---

This invention relates to a distance measuring apparatus.

Methods of measuring distance have been proposed in which a modulated beam of light or infra-red radiation is transmitted over the distance to be measured and the relative phase of the modulation of the beam received after traversing said distance is compared with the phase of said modulation at transmission. Such a method is described, for example, in the applicants' co-pending application Ser. No. 409,844, filed Nov. 9, 1964.

According to the present invention, distance measuring apparatus comprises means for transmitting a light or infra-red beam which has been modulated by a signal having a stabilised predetermined wavelength and marked by amplitude pulses which are short compared with the modulation wavelength; means for receiving the beam after propagation over the distance to be measured; means for counting the number of cycles of the modulation signal between transmission of a said pulse and reception thereof; and means for measuring the phase difference between the modulation of the transmitted and received beam, whereby the distance to be measured is given in terms of a whole number of modulation wavelengths determined by the count and a fraction of a modulation wavelength determined by the phase difference measurement.

Preferably the modulation signal is produced by a modulation oscillator the wavelength of which is controlled by a cavity resonator through the intermediary of a frequency multiplier, the cavity resonant wavelength being a harmonic of the modulation wavelength.

Automatic wavelength control of said oscillations may be provided. Thus the modulation oscillator may be frequency modulated from a further oscillator at a predetermined frequency and the amplitude modulated response of the cavity resonator may be compared in a phase sensitive rectifier with the signal from said further oscillator to produce an output which is used as an automatic wavelength control to maintain the modulation wavelength of said modulation oscillator constant.

Preferably the cavity resonator contains air and is provided with means for maintaining its air content dry and at a predetermined temperature and pressure. Said predetermined temperature and pressure are preferably those of the ambient air along the path over which the distance is to be measured, the modulation oscillator then being inherently compensated for refractive index changes along said path.

Means are preferably provided for starting operation of the counter means automatically upon the occurrence of an amplitude pulse in the transmitted beam and means are further provided for stopping operation of the counter means automatically upon the occurrence of said pulse in the received beam. Said counter means may be a binary counter having automatic digital read-out and automatic resetting means which are adapted to reset the counter after a predetermined interval following the transmission of each amplitude pulse.

The marking amplitude pulses preferably have a repetition period which is long in relation to that of the modulation signal.

In a preferred embodiment of the invention, the apparatus has two similar receiver channels, one adapted to receive the modulated beam before it has been propagated over the distance to be measured and the other adapted to receive the beam after it has been so propagated, wherein each channel includes a respective mixer fed with local oscillations from a common source, the respective mixer outputs being fed to respective inputs of a phase detector. The channel from one mixer to said detector preferably contains an adjustable phase shift device and the phase difference measurement is made by observing the phase shift adjustment necessary to produce a given relation between the two inputs to the detector.

Each of said two channels preferably includes a respective photo-diode one output of which is fed to the respective said mixer and the other output of which is fed via a high-pass filter adapted to separate the amplitude pulses, the output from the high-pass filter associated with the channel in receipt of the modulated beam before its propagation over said distance being adapted to actuate a control gate for starting operation of the counter means and the output from the other high-pass filter being adapted to actuate a control gate for stopping operation of the counter means.

The invention will be described, by way of example only, with reference to the accompanying drawing, which is a schematic diagram showing one possible arrangement of apparatus according to the invention.

The drawing illustrates an apparatus for measuring distance by means of a modulated light beam. The distance to be measured is the distance from a light source 10 of a reflector 11. The reflector 11, which may conveniently take the form of a "cat's eye" reflector or corner cube prism, is arranged to reflect a light beam 12 emitted by the source 10 through 180°, so that the beam is returned towards the source 10. The returning beam 13 is intercepted by a beam divider device 14 such as a semi-silvered mirror, so that the beam is diverted into one channel A of a receiver device 15.

The source 10 emits a further beam indicated at 16, which travels over a small fixed distance and enters a second channel B of the receiver device 15. The source 10 comprises a forward-biased diode the emitted light from which is modulated by a modulation oscillator 17 at a modulation wavelength $\lambda_M$, conveniently 20 meters. It will be appreciated, however, that any convenient source of continuous light or of infra-red radiation may be employed as the source 10.

The source 10 is additionally modulated by a pulse generator 18 which superimposes on the modulated light beam 12 emitted by the source 10 a train of short marker pulses, for example, of 10 nanosec. duration, at a repetition frequency $F_p$, conveniently 100 c./s.

An automatic wavelength control system incorporating a resonant cavity is used to maintain the wavelength of the modulation oscillator 17 constant. The output of the oscillator 17 is monitored through a frequency multiplier 20 which, in this example, multiplies the oscillator frequency by 100. The output of the multiplier 20 is used to energise a cavity resonator 21, the fundamental resonant wavelength $\lambda_R$ of which is accurately adjusted to a predetermined value bearing a fixed relation to the desired wavelength of the modulation. If the modulation oscillator 17 is to oscillate at a modulation wavelength $\lambda_M$ then it is arranged that the cavity resonator 21 has a fundamental resonant wavelength $\lambda_R$ such that $$\lambda_N = N \times \lambda_R$$

where N is the multiplication ratio of the frequency multiplier 20. Thus if the frequency multiplication ratio of multiplier 20 is 100, and the desired modulation wavelength, 20 metres, corresponds to a modulation frequency of approximately 15 mc./s., then the cavity resonant wavelength is adjusted to be exactly 20 cm.

The cavity resonator 21 is conveniently of the coaxial line type, and is filled with dry air at the ambient temperature and pressure of the path over which the distance is to be measured. For this purpose the resonator 21 is provided with a communicating chamber 22 containing a drying agent, and a chamber 23 containing a pressure equaliser, such as a bellows device. A resonator of this type is described, for example, in the applicants' co-pending patent application Ser. No. 409,844, filed Nov. 9, 1964. By filling the resonator 21 with dry ambient air the resonant wavelength $\lambda_R$ and, therefore, the modulation wavelength $\lambda_M$, is inherently compensated for changes in the refractive index of the air along the path to be measured, and the modulation wavelength $\lambda_M$ produced by the oscillator 17 is maintained constant.

A frequency modulation at a frequency $F_f$, conveniently 1 kc./s., is also imposed on the oscillator 17 from a further oscillator 24 through a frequency modulator 25. The signal in the cavity resonator 21 is monitored by a UHF AM (Amplitude Modulation) detector 26, the amplitude modulated output of which, at the frequency $F_f$, is fed to a phase sensitive rectifier 27, where the phase of this signal is compared with a reference signal at the frequency modulation frequency $F_f$ taken direct from the further oscillator 24. The phase sensitive rectifier 27 is provided with a null indicator 27a which indicates when the two inputs to the phase sensitive rectifier 27 have the same relative phase. The D.C. output of the phase sensitive rectifier 27 is connected through a wavelength control circuit 28 to the modulation oscillator 17 to control the wavelength thereof.

The system as described above is a well known type of automatic wavelength control system. Any departure of the modulation oscillator 17 from the desired modulation wavelength corresponding to the resonant wavelength $\lambda_R$ of the cavity resonator 21 will result in a relative phase change in the frequency modulation signal $F_f$ detected by the detector 26, which in turn will produce a corresponding phase change in the A.M. output of the detector 26. The two inputs to the phase sensitive rectifier 27 will then have a relative phase difference, and the resulting D.C. output of the phase sensitive rectifier 27 is arranged to actuate the wavelength control circuit 28 in the sense of adjusting the wavelength of oscillator 17 towards the desired modulation wavelength $\lambda_M$. The modulation wavelength $\lambda_M$ of the light beam is therefore maintained by the cavity resonator 21 at a constant wavelength which is a sub-harmonic of the cavity resonant wavelength $\lambda_R$.

Each of the two channels A, B of the receiver device 15 comprises a respective superheterodyne receiver. The respective receiver channels have respective photo-diodes 30A, 30B which produce respective modulated electrical signals corresponding to the modulated light beams 13, 16 respectively, incident thereon. The two diode outputs are passed through respective tuned amplifiers 31A, 31B to respective balanced mixers 32A, 32B. The respective signals are heterodyned in the respective mixers 32A, 32B with a signal from a common local oscillator 33, the frequency of which exceeds the modulation frequency $F_m$ by an intermediate frequency $F_i$, conveniently 10 kc./s.

The intermediate frequency output signals from the respective mixers 32A, 32B are passed through respective low-pass filters 34A, 34B and respective wide band amplifiers and limiters 35A, 35B. The respective output signals $S_A$, $S_B$ of the respective amplifiers and limiters 35A, 35B correspond respectively to the light beam 13 which has traversed the distance to be measured and the light beam 16 which has traversed the short fixed distance. The signal $S_A$ forms the first input to a phase sensitive rectifier 36, while the signal $S_B$ is passed through an adjustable phase shifter device 37 to the second input of the phase sensitive rectifier 36. The phase sensitive rectifier 36 is provided with a null indicator 36a for indicating the condition of zero relative phase between the two inputs thereto.

The phase shifter device 37 is conveniently of the synchro-resolver type, having a digital read-out 38 which indicates the phase shift introduced by the device 37 and which is conveniently calibrated in terms of distance up to a maximum of one-half a modulation wavelength, $\lambda_M/2$. In this particular example, with a modulation wavelength $\lambda_M$ of 20 metres, the digital read-out 38 would be calibrated from 0 to 10 metres.

A second electrical signal is taken from each of the photo-diodes 30A, 30B through respective high-pass filters 36A, 36B to a "stop" gate 37 and a "start" gate 38 respectively. The high-pass filters 36A, 36B are adapted to pass only the short (10 nanosecond) marker pulses, said pulses being adapted to operate the respective gates 37, 38. The "start" and "stop" gates 38, 37 respectively are adapted to "start" and "stop" respectively the operation of a binary counter 40 which is connected through a pulse squarer 41 to the modulation oscillator 17. The binary counter 40 is provided with a digital read-out 42, which is calibrated in intervals of half a modulation wavelength (10 metres) from 0 to 10,000 metres.

The operation of the device will be clear from the foregoing description. When a given marker pulse is superimposed on the modulated light beam, the occurrence of this pulse in the receiver channel B will actuate the "start" gate 38 and thereby initiate operation of the counter 40. The occurrence of the same given marker pulse in the receiver channel A after said pulse has made a double traverse of the distance to be measured between the source 10 and the reflector 11, operates the "stop" gate 37 to halt the operation of the binary counter 40. The observed digital read-out of the counter 40 at 42 will therefore give a direct indication of the total time taken by said marker pulse in traversing the path from the source 10 to the photo-diode 30A via the reflector 11 and the beam divider device 14 relative to the time taken for said pulse to traverse the small fixed path 16 to the photo-diode 30B, the counter 40 recording the number of whole modulation cycles counted thereby in this time interval. The digital read-out 42 therefore indicates this number of cycles in units of the modulation half-wavelength $\lambda_M/2$, as a distance to the nearest modulation half-wavelength $\lambda_M/2$.

The amount to be added to the distance indicated by the counter digital read-out 42, which will, of course, be a distance less than a modulation half-wavelength, is indicated by the digital read-out 38 when the phase shifter device 37 has been adjusted (manually or automatically) so that the null indicator 36a indicates zero phase difference. The sum of the two distances indicated by the digital read-outs 38, 42 gives the total distance traversed by the beam 12 relative to the beam 16, the indications preferably being expressed directly in metres. With the particular apparatus illustrated, distances of up to 10,000 metres could be measured to the nearest centimetre.

We preferably provide automatic resetting means for the binary counter 40. Thus the counter 40 is adapted to be re-set by pulses from a re-set pulse former 43 which is in turn actuated by pulses from a delay monostable circuit 44. The circuit 44 is actuated at the pulse repetition frequency $F_p$ from the pulse generator 18 and introduces a delay corresponding to a total time of travel of the marker pulses well in excess of that corresponding to the maximum distance to be measured (in this case 10,000 metres), for example, 1 millisecond. After each digital read-out from the binary counter 40 corresponding to the transmission and reception of a given marker pulse, the binary counter 40 is therefore re-set after a delay of 1 millisecond so that it is ready to count the modulation cycles between the transmission and reception of the next marker pulse. The binary counter 40 therefore repeats its measurement automatically every $\frac{1}{100}$ of a second, and, since the eye cannot resolve the flicker due to 100 cycles sec,. the counter 40 appears to give a continuous read-out.

We claim:

1. Distance measuring apparatus comprising: means for transmitting a beam of radiation selected from the visible and infra-red regions of the spectrum over a distance to be measured; a modulation oscillator for generating a modulation signal having a stabilized predetermined wavelength and marked by amplitude pulses which are short compared with said wavelength; a cavity resonator for controlling the wavelength of said modulation oscillator; a frequency multiplier connected between said resonator and said oscillator, the cavity resonant wavelength being a harmonic of the wavelength of the modulation oscillator; means for modulating said beam with said signal; means for receiving the beam after propagation over the distance to be measured; counter means for counting the number of cycles of the modulation signal between transmission of said pulse and reception thereof; and means for measuring the phase difference between the modulation of the transmitted and received beam, whereby the distance to be measured is given in terms of a whole number of modulation wavelengths determined by the count and a fraction of a modulation wavelength determined by the phase difference measurement.

2. Apparatus as claimed in claim 1 including a further oscillator for frequency modulating the modulation oscillator at a predetermined frequency and a phase sensitive rectifier for comparing the amplitude modulated response of the cavity resonator with the signal from said further oscillator to produce an output, means being provided for utilising said output as an automatic wavelength control to maintain the wavelength of said modulation oscillator constant.

3. Apparatus as claimed in claim 1 wherein the cavity resonator contains air and is provided with means for maintaining its air content dry and at a predetermined temperature and pressure.

4. Apparatus as claimed in claim 3, said predetermined temperature and pressure being those of the ambient air along the path over which the distance is to be measured.

5. Apparatus as claimed in claim 1 wherein means are provided for starting operation of the counter means automatically upon the occurrence of an amplitude pulse in the transmitted beam and means are further provided for stopping operation of the counter means automatically upon the occurrence of said pulse in the received beam.

6. Apparatus as claimed in claim 5 wherein the counter means is a binary counter having automatic digital read-out and automatic resetting means which are adapted to reset the counter after a predetermined interval following the transmission of each amplitude pulse.

7. Apparatus as claimed in claim 1 wherein the marking amplitude pulses have a repetition period which is long in relation to that of the modulation signal.

8. Apparatus according to claim 1 and further comprising: two similar receiver channels, one channel being adapted to receive the modulated beam before it has been propagated over the distance to be measured and the other channel being adapted to receive the beam after it has been so propogated, each channel including a respective mixer; a common source feeding local oscillations to each mixer; a phase detector, and means feeding the respective mixer outputs to respective inputs of the phase detector.

9. Apparatus as claimed in claim 8 wherein the means feeding the output from one of said mixers to said phase detector includes an adjustable phase shift device and the phase difference measurement is made by observing the phase shift adjustment necessary to produce a given relation between the two inputs to the detector.

10. Apparatus as claimed in claim 8 wherein each respective receiver channel includes a respective photo-diode having two outputs, one output of which is fed to the respective said mixer, and including a high pass filter through which the other output of the photo-diode is fed, said high pass filter being adapted to separate the amplitude pulses, and a control gate actuated by the output from the high pass filter associated with the receiver channel in receipt of the modulated beam before its propagation over said distance, said control gate being adapted to start operation of the counter means and a further control gate actuated by the output from the other high pass filter, said further gate being adapted to stop operation of the counter means.

References Cited

UNITED STATES PATENTS

| | | | |
|---|---|---|---|
| 2,966,090 | 12/1960 | Scholdstrom | 343—14 X |
| 3,249,937 | 5/1966 | As et al. | 343—14 |
| 3,298,024 | 1/1967 | Bohm | 343—12 |

RODNEY D. BENNETT, Jr., Primary Examiner

J. P. MORRIS, Assistant Examiner

U.S. Cl. X.R.

343—14